United States Patent

Mawston et al.

[11] Patent Number: 5,866,274
[45] Date of Patent: Feb. 2, 1999

[54] MULTIPLE BATTERY COMPRISING A CRANKING BATTERY AND AN AUXILIARY BATTERY

[75] Inventors: Ian Grant Mawston, Auckland; Iain Wallace Waugh, Hamilton, both of New Zealand

[73] Assignee: GloryWin International Group, Ltd., Hong Kong, Hong Kong

[21] Appl. No.: 615,887

[22] Filed: Mar. 14, 1996

[30] Foreign Application Priority Data

Mar. 15, 1995 [NZ] New Zealand .......................... 270 723

[51] Int. Cl.[6] .................................................. H01M 16/00
[52] U.S. Cl. .................................. 429/9; 429/150; 429/180
[58] Field of Search .............................. 429/9, 150, 180

[56] References Cited

U.S. PATENT DOCUMENTS

| | | | |
|---|---|---|---|
| 1,588,803 | 6/1926 | Owen | 429/150 X |
| 3,475,221 | 10/1969 | Jordan et al. | 429/9 |
| 3,758,345 | 9/1973 | Toth | 136/181 |
| 4,239,839 | 12/1980 | McDowall et al. | 429/154 |
| 4,883,728 | 11/1989 | Witehira | 429/160 |
| 5,002,840 | 3/1991 | Klebenow et al. | 429/9 |
| 5,108,848 | 4/1992 | Kramer | 429/9 |
| 5,154,985 | 10/1992 | Tanaka | 429/9 |
| 5,162,164 | 11/1992 | Dougherty et al. | 429/9 |
| 5,223,351 | 6/1993 | Wruck | 429/9 |

FOREIGN PATENT DOCUMENTS 0 513 531  11/1992  European Pat. Off. ....... H01M 10/42

*Primary Examiner*—Stephen Kalafut
*Attorney, Agent, or Firm*—Seidel, Gonda, Lavorona & Monaco, P.C.

[57] ABSTRACT

Batteries for boats and vehicles require a CRA (cranking) battery 23 and an AUX (auxiliaries) battery 22 to ensure a start. The preferred version has an AUX battery made of parallel plates and a CRA battery made of parallel plates lying in a monobloc case in face to face positions. Each battery has a pair of CRA terminals 20, 30 for the electric starter and a pair of AUX terminals 19, 31 for the AUX loads of the vehicle and the alternator. The AUX and CRA negative are joinable by a link or a switch 41 so that a single earth connection is made to the vehicle. Alternatives show the AUX and CRA batteries side by side, at 90 degrees, providing 24 v or 36 v with a 12 v tap; a CRA battery with two AUX batteries one 51 for constant voltage equipment. Advant-ageous disposition of terminals simplifies connections to vehicle wiring and to a like battery.

33 Claims, 6 Drawing Sheets

MULTIPLE BATTERY COMPRISING A CRANKING BATTERY AND AN AUXILIARY BATTERY

FIELD OF THE INVENTION

This invention concerns batteries, preferably for use in automotive and marine applications. In particular this invention relates to housing two or more series of cells in a battery container in such a way as to maximize the ease of manufacture, while also maximizing the functionality of the battery and allowing it to be easily connected into to a vehicle and to controlling electronic circuitry.

BACKGROUND OF THE INVENTION

In our copending New Zealand applications: 236660, 244007, 247509, 264225, 270344 we have described this kind of battery and switches which control the charging and discharging of such batteries as the vehicle operates. The contents of these specifications are hereby incorporated by way of reference.

The conventional automotive SLI battery consists of six 2.1 volt Lead acid cells connected in series. The SLI battery has a number of functions that it must perform. Firstly it must be able to provide high amounts of current to the starter motor to start the vehicle. secondly, it must be able to supply a stable voltage to the ignition and fuel systems of the vehicle during starting. Thirdly it must be able to supply reserve current to the ignition and lights of the vehicle when the alternator is not providing current. Fourthly it must be able to supply current to power electrical accessories which draw current over long periods of time when the vehicle is not running.

Ideally the battery should have a life in excess of two years, and it must be able to provide enough energy to start the vehicle even in all weather extremes. Also the battery must be able to withstand being partially discharged without suffering significant capacity loss. Low in terminal resistance is a requirement for high energy output in a battery. Batteries with a very low internal resistance, due to the construction required to achieve this low internal resistance do not have particularly good deep cycle performance. Batteries with good deep cycling characteristics, usually do not have the high current capability required for starting vehicles at low temperatures. The battery must also be low in weight, small in size, and of as low a cost as possible to meet motor vehicle manufactures requirements. By incorporating two separate batteries, a deep cycle battery and a starter battery in a single case it may be possible to meet these requirements. We refer to the starter battery as the cranking battery (CRA) and to the deep cycle battery as the auxiliary (AUX) battery.

Normally when starting the engine of a vehicle at low temperatures the starter draws large amounts of current and the voltage at the battery terminal falls considerably. There may be sufficient energy to turn the starter motor however there may be insufficient voltage to properly power the ignition and fuel systems. A dual battery has two separate and independent voltage outputs, thus the starter motor can be supplied from the starter terminal of the battery and the ignition system can be powered from the other positive terminal of the battery. Thus the ignition system will receive a smooth voltage of approximately 12 volts even though the terminal voltage of the starter battery may fall below 5 volts during starting. This means that the starting performance using a dual battery can be superior to that of a single SLI battery.

Using a dual battery, it may be possible to allow one battery to be discharged while conserving energy in the other battery to start the vehicle.

There have been many attempts at putting two 12 volt series of cells into a single container, however none so far have been particularly successful, as the method for constructing the battery has been incompatible with standard battery manufacturing equipment or final manufactured form of the battery has been significantly different from that of a conventional SLI battery in terms of sizing or terminal layout and thus has had difficulty in fitting into an automobile.

In U.S. Pat. No. 3,475,221, Jordan describes a four terminal automotive battery with two parallel stacks of plates in each of the six cells in the battery. The disadvantage with such a simplistic arrangement is that should one stack of plates become discharged or fail then the other stack of plates which shares common electrolyte will also become discharged. As terms of art an element comprises positive and negative groups nested together with separators in place. A group is an assembly of plates of like polarity burned to a common strap.

In U.S. Pat. No. 3,758,345, Toth describes an automotive battery with a set of U-Shaped plates which constitute the main series of cells and a set of small rectangular plates which are accommodated in the space defined by the U in the large plate, which constitute the auxiliary series of cells. Because the cells share a common watering device, the electrolyte in the auxiliary cells is not separated from the electrolyte in the main cells.

U.S. Pat. No. 4,883,728 (Witehira) describes a 3-terminal automotive battery containing two 12 volt series of cells, with a common negative terminal in a single container. The design of battery that Witehira proposes has many inherent disadvantages. The provision of a common negative terminal makes it impossible to connect the batteries in series. Thus two 12 v batteries cannot be joined to make a 24 v source for trucks and special purpose vehicles. The design and layout of the proposed battery means that the positioning of the terminals is restricted. The construction of the proposed battery requires a total of 11 inter-cell welds as opposed to the 5 in a conventional 12 volt battery. The inter-cell welds are not all on the same axis so a single axis inter cell welder would not be suitable for manufacturing the battery. The plates and cell elements are placed in the battery in a North-South arrangement as opposed to the standard arrangement of laying the plates in an East-West fashion. Not only does this mean that most of the inter-cell welds are at right angles to those in a conventional battery but the plates are also laid in the battery at right angles to those in a conventional battery. The two positive terminals due to the close positioning of the two terminal cells, must be placed extremely close to each other. This has a number of disadvantages, notably that the terminal clamp on one terminal may short circuit the other terminal. Also if one terminal is at a higher potential to the other terminal and a thin film of liquid exists on the lid of the battery, electrochemical reactions may easily occur. Also due to the positioning of the terminal cells, the terminals are located in the middle of the battery, not the side as is usual. Thus it may be difficult for cable clamps to reach the battery terminal.

Examined Japanese Patent application 1-29022 in the name of Nippon Denso K.K. describes a 3-terminal automotive battery containing two 12 volt series of cells, with a common negative terminal in a single container. In this design they propose one series of cells with a larger capacity for starting the vehicle and another series of cells with a smaller capacity for providing a stable voltage to electrical equipment. The negative terminals of the two series of cells are internally connected to so that only one communal negative terminal extends from the case. Because the two series of cells are arranged side by side, conventional width plates cannot be used in the construction of this battery. Also because the plate widths are narrower than in conventional batteries, there are restrictions for casting the strap using a conventional group burning or cast on strap machine. The Battery contains 11 inter-cell wields, 10 of them are on the North-South axis and one of the on the East-West. Thus a multi access inter cell welding machines would be required on a production line. The battery has a common negative terminal so two of these batteries cannot be connected in series for 24 volt operation. The proposed battery does not provide for different construction methods in the two series of cells. Thus the cells are not optimized to provide deep cycling and starting functions and only a single plate type is used.

U.S. Pat No. 5,162,164 (Dougherty etal) and U.S. Pat. No. 5,002,840 (Klebenow etal) describe a 12 volt automotive battery with an external positive and negative terminal. The battery contains two series of six cells connected in parallel via a switch. The first series of cells is transposed along a first axis and the second series of cells is placed along a second axis transverse to the first axis. Bus bars are described for connecting the like terminals of the two series of cells. The bus bars are suspended between the battery lid and the battery case. The bus bars are covered by a chlorinated polyolefin plastic sleeve, which protects the bus bar from corrosion from the electrolyte, and allows them freedom of movement. The battery has only a single pair of terminals, thus it cannot provide two independent current sources simultaneously.

McDowall in U.S. Pat. No. 4,239, 839 describes a modular multicell battery wherein a barrier is inserted into mutually parallel array of identical plates (frames or separators). The barrier divides the cuboid container into two separate batteries each of which with its own volume of electrolyte. The position of the barrier partitions the plates into 33 the desired ratio in order to secure the selected outputs. the capacity is increased by adding more frames and separators.

EP 92106302 (Robert Bosch GmbH) uses two separate batteries mounted one on top of the other. One battery is a high current type for starting and the other is a deep cycle type for powering electrical accessories. Because the batteries are mounted one on top of the other, the access to the lower battery is hindered and this introduces servicing and testing difficulties.

SUMMARY OF THE INVENTION

This invention provides a battery for vehicle use comprising a CRA battery for connection to a starter motor for cranking the vehicle during starting and an AUX battery each being of different construction and each capable of providing a current different from the other and capable of being discharged without excessive loss in capacity, wherein both batteries are housed in a single container, and contain mutually parallel plates, the AUX and CRA batteries lying face to face in a single battery case.

The battery is easily manufactured with conventional battery manufacturing equipment. Since the battery size is defined in standards such as DIN, dual batteries whose size does not conform cannot be mounted in vehicles due to the restrictions on the size of holders and trays. Furthermore, the terminals must protrude from the battery in similar positions as those of conventional SLI batteries or the cables which connect to the battery terminals, which are usually intentionally provided with little tolerance to prevent reverse battery connection, will not fit. In dual batteries this has been a significant problem as the terminal post usually extends directly from the strap of a positive or negative group. This restricts the position the battery terminals can be placed once the case has been laid out to accept the elements.

It is preferable to lay the battery elements in rows whereby the rows are along the length of the battery. This means that most or all of the inter-cell welds will be on the same axis and thus the battery will be faster to assemble. If two parallel rows of elements run the length of the battery (FIG. 7), then some freedom of positioning the straps connected to the terminal elements may be possible, thus it is possible to make the two positive terminals of the battery close together, or further apart.

It may be desirable to place both positive terminals on one side of the battery lid or container, as a number of standard battery sizes have a left-hand and a right-hand form. Using conventional battery manufacturing techniques this may not be possible to implement. However, by connecting the terminal group to a conductor which is embedded in the lid which connects to the exposed terminal, the terminal may be located in any position desired. Thus, even though the auxiliary (deep cycle) elements may be connected in series in a row on the left hand side of the battery, and the starter elements may be connected in series in a row on the right hand side of the battery, both sets of like terminals may be placed on the right hand or left hand side of the battery by using a conductor means (FIG. 8).

If instead of making two rows of elements, alternatively a single row of elements could be used. For example twelve cells could be placed in line. There would be two 6 cells series, each series producing 12 volts. Using conventional battery construction methods, this would produce an unsatisfactory terminal arrangement as terminal groups would be at three locations in the battery: at either end of the battery and in the middle of the battery, (FIG. 2). Ideally however there would be a negative terminal or terminals at one end of the battery and a positive terminal or terminals at the other end of the battery (FIG. 12, 13). To achieve this, conductors are required to allow the terminals to be placed remotely from the terminal groups.

It may be desirable depending on the proposed application to provide the auxiliary series of cells with an individual positive and negative terminal, and the starter series of cells with a positive and negative terminal. Thus two of these batteries may be connected in series to form a 24 volt series of auxiliary cells and a 24 volt series of starter cells (FIG. 11).

The second alternative of placing the cells in a single row may be desirable if standard width plates are required for production. Thus the manufacture of these batteries can be carried out without producing new grid moulds, or changing the set up on the plate pasting machine. The first alternative of placing the cells is two rows may be desirable if longer cells in which a greater number of plates can be stacked is required.

It may be desirable to make one series of cells of a different size to the other series of cells. If a battery were manufactured, intended for use in small diesel vehicles, the demand for starting current would be high, and the requirement for reserve current would be low, thus the starter cells could be made to be larger than the auxiliary cells.

In many applications where only 12 volts is required the provision of two negative terminals could be confusing and make the battery installation process more time consuming as a second earth strap needs to be connected from the second battery negative terminal to the vehicle chassis. If the two negative terminal cells are adjacent it may be possible to internally connect the two cells using an inter-cell weld through the case partition or by moulding a lead connector in the lid which can be soldered in the conventional manner to both negative terminal groups to provide a communal negative terminal. Alternatively it may be desirable to provide a removable link on the outside of the battery so the link may be connected and the negative terminals are communal, or the link may be removed and the negative terminals may be independent. The link would ideally be a conductive material, which is corrosion resistant. It could be implemented in the form of a link with two holes that bolt on to supplementary threaded post from the auxiliary and cranking terminals. Alternatively the link could be implemented in the form of a mechanical or electronic switch which could be manually or automatically opened or closed.

The battery case may be a one piece molding, alternatively it may be formed of two or more pieces that fit together. The material may be PP or other polymer or copolymer suitable for battery casings. The wall thickness may be 0.3–5.0 mm. The internal resistance of the auxiliary cells and the cranking cells may not necessarily be equal, but depending on the application it may be desirable for one to be larger than the other. It is desirable to place the terminals in convenient positions; to implement this, conductors may have to be embedded in the lid of the battery.

The design and manufacture of multi-pole, multi-batteries within a common case, especially when such an assembly is implemented in conjunction with a mechanical or electronic control system, is greatly facilitated if reliable connections between the component parts can be made using a matrix of embedded conductors. In the usual case this conductor matrix is embedded and situated in the lid to provide convenient connection between pole bushes and various bushes, studs and other connector structures. Also embedded conductors may e employed to connect stand alone connector structures to one another. Ideally embedded conductors should have properties of: low resistance, high corros ion resistance, mechanical robustness, easily manufactured, easily and reliably incorporated in the lid, readily connected to other conductors, flexible design limits, economic implementation. Presently, an embedded conductor system has been implemented in a battery as described above, that has most of the characteristics of the ideal system.

Description of the Embedded Conductor System:

1. The conductor primarily consists of either soft or hard drawn copper strip that has been coated with either tin or tin based solder by a process of plating and/or dipping.
2. The width, type, and thickness of the strip employed is calculated on the basis of the expected electrical and mechanical duties. It takes into consideration factors such as maximum current and its duration, maximum allowable voltage drop, maximum permissible temperature rise, length between connection points.
3. Provision is made in the design for connection to be made to other structures by casting, soldering, brazing welding screwing or any combination of these. In each case the point of connection is protected from corrosion by methods as described in 1, above.
4. To prevent mechanical instability and poor positional accuracy of the connector system during loading into the injection molding tool or to prevent this situation arising during the molding process, additional wings, struts, and stud structures are provided that form part of the overall connector design.
5. To allow these mechanical structures to be fully effective, separately molded plastic parts (using the same or compatible material to that of the lid) are fitted to or over the item in question to form a semi rigid interface between it and the surfaces(s) of the injection mold tool.
6. The spacer parts usually take the form of cups for stud ends, rings or sleeves (with or without internal or external fins) for rectangular sections and other types of structural members of simple cross section for lateral and longitudinal conductor components. The design of any such part incorporates features that allow free flow of plastic in and around the metallic conductor portion (for proper encapsulation) while at the same time holding it in it's defined position for a defined period of time. In addition, it is desirable that near the end of the injection cycle that the spacer has undergone a small degree of overall surface melting to ensure completed bonding to the injected material and to ensure that the metallic conductor is hermetically sealed inside of the lid. Aluminium and silver are also useful.

BRIEF DESCRIPTION OF THE DRAWINGS

Certain embodiments of the invention are now described with reference to the drawings in which

FIG. 1 shows a battery described by Jordan, consisting of lower capacity element and a higher capacity element in a single cell 3 sharing a common electrolyte. The battery has four terminals: positive terminal of the first series of elements 4, negative terminal of the first series of elements 5, positive terminal of the second series of elements 6 and negative terminal of the second series of elements 7. In total the battery has 6 cell compartments and 12 elements. FIG. 2 shows a battery described by Globe-Union, consisting of 6 reserve cells in series 8a, 8b, 8c, 8d, 8e and 8f and 6 main cells in series 9a, 9b, 9c, 9d, 9e and 9f. There are two terminals, a communal positive 10 and communal negative 11, connector means 12 and a switch 13. The battery is housed in a container 14.

FIG. 3 shows a battery proposed by Witehira, consisting of a series of starter cells 16a, 16b, 16c, 16d, 16e, 16f, where 16a is the negative terminal cell and 16f is the positive terminal cell, and a series of auxiliary cells 17a, 17b, 17c, 17d, 17e and 17f where 17a is the negative terminal cell and 17f is the positive terminal cell. A communal negative terminal 15 is joined to the negative groups in cells 16a and 17a. The battery contains 11 inter cell connectors on two axes, marked 18. The battery has an auxiliary positive terminal 19 and a starter positive terminal 20. The battery is housed in a container 14 FIG. 4 shows a battery terminal layout proposed by Nippon Denso K. K. The battery has a communal negative terminal 15, a starter positive terminal 20 and an auxiliary positive terminal 19.

FIG. 5 shows an early dual battery wherein the case 14 contains 2 series of cells side by side. There is an AUX battery 22 consisting of cells 23a–f and a CRA battery 23 consisting of cells 24a–f designed to be suitable providing high current for starting. Cells 23a and 24a are negative terminal cells. Cells 23f and 24f are positive terminal cells. The battery has a communal negative terminal 15, and the two negative terminal cells are connected by an internal conductor 25. Ten of the inter-cell welds are on the same axis 26. The battery has an auxiliary positive terminal 19 and a starter positive terminal 20.

In FIG. 6 the case 14 contains an AUX battery 22 and a CRA battery 23 of cells a first series of cells side by side. Cells 27a–f are of a different construction and occupy a volume different from that of the cells 28a–f. The positive terminal 29 of the AUX battery may be located remotely from the positive terminal cell 27f and may be connected via an internal conductor 25. The battery has a CRA positive terminal 20. The two negative terminal cells 28a may be connected together via an internal conductor 25 and connected to a communal terminal 15.

In FIG. 7 the CRA battery positive 20 and the CRA battery negative 30 are large post terminals suited to carry the large starter motor current. The AUX battery terminals 29 and 32 are smaller and stand adjacent the larger terminals. Spare terminal 40 and the four working terminals are all grouped along one side of the case.

In FIG. 8 the case 14 accommodates an AUX battery 22 with thick battery plates and a larger CRA battery 23 with thin plates. The twelve cells are divided into AUX and CRA batteries by a barrier 33 which is parallel to all the plates of both batteries. The cells are filled via the twelve caps 34 and inspected using the twelve tell-tale levels 35. The CRA battery terminal 20 has a conductor 36 in the lid. Likewise the smaller AUX battery terminal 19 has a like conductor in the lid. The CPA battery negative terminal 30 has a long strip conductor 37 in the lid which is seated initially in the moulding stage by integral spacers 38. The strips make contact with droppers which reach the tags and other standard parts at the top of the plates. The AUX battery terminal 31 stands beside the larger CRA terminal 30. A T-branch 39 of the strip conductor permits a spare terminal 40 to stand next to the AUX terminal. Negative terminals 32 and 31 may be brought to a communal potential by metal link 36.

Figure 1:
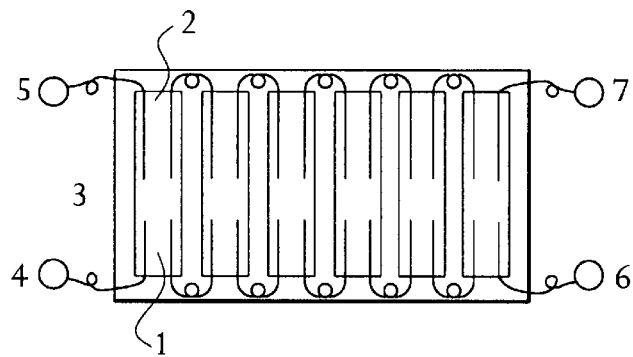
FIGS. 1–4 are diagrammatic plans of prior art batteries
Figure 2:
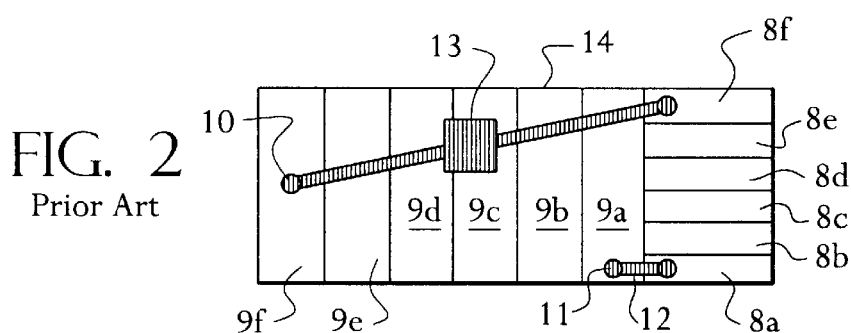
Figure 4:
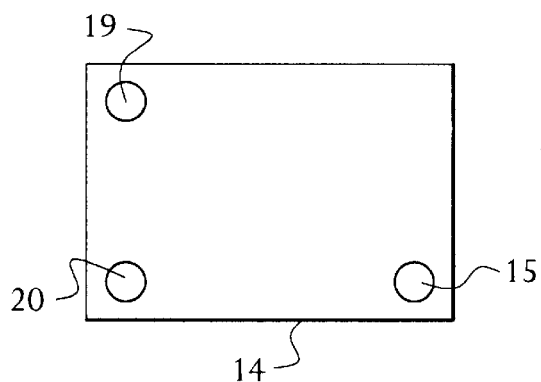
Figure 3:
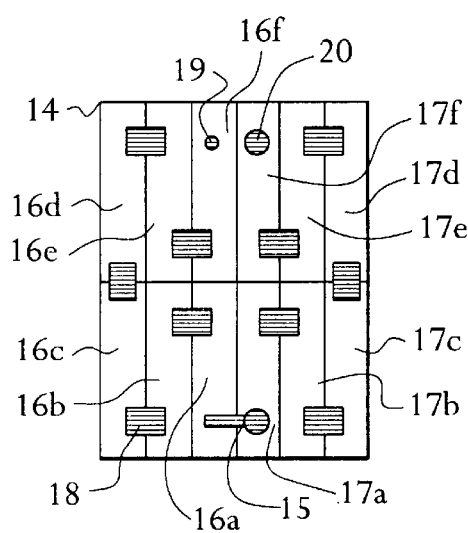
Figure 5:
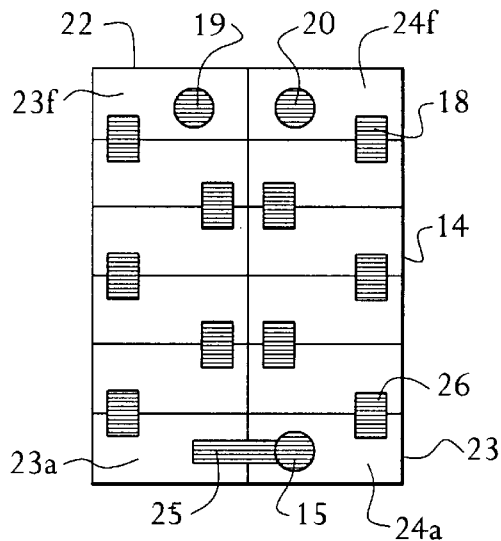
FIG. 5 is a diagrammatic plan of a 3-pole battery with aligned inter cell connections.
Figure 9:
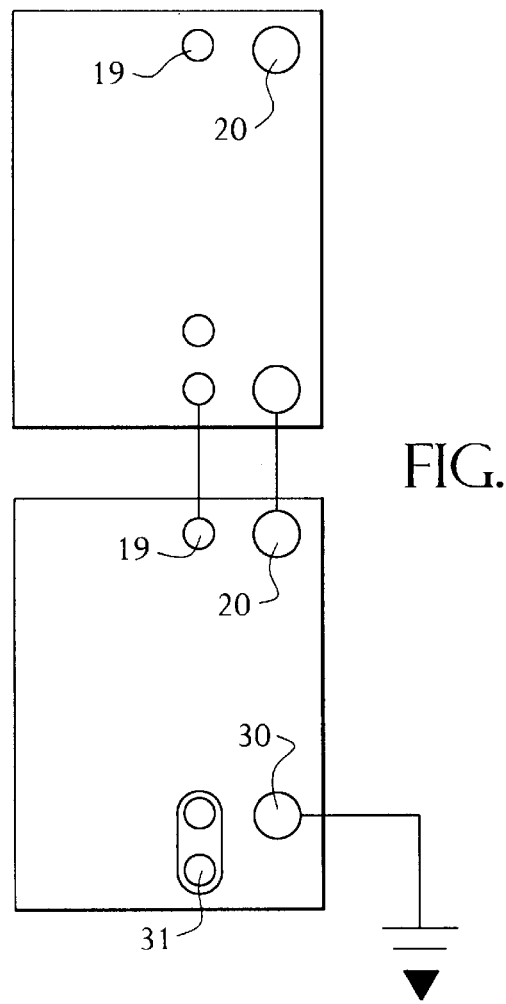
FIG. 9 is a diagrammatic plan of a pair of 4-pole batteries connected in series.
Figure 6:
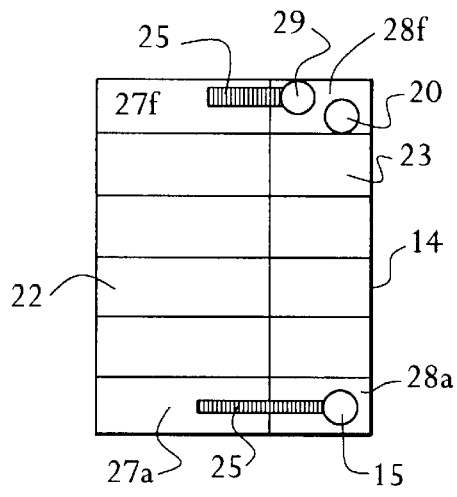
FIG. 6 is a diagrammatic plan of a 3-pole battery.
Figure 7:
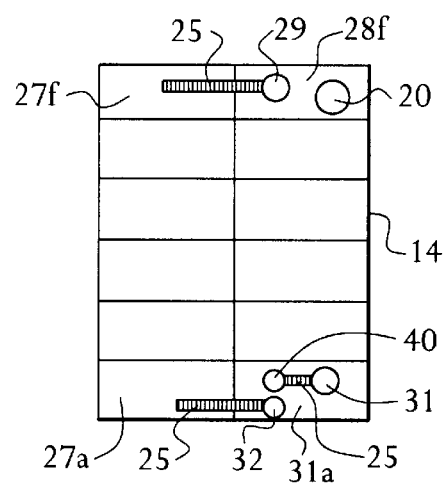
FIG. 7 is a diagrammatic plan of a 4-pole battery.

When the battery is paired with a second battery as seen in FIG. 9 the link is removed allowing the AUX and CRA negative terminals to join with the like poles of the paired battery. the removal of the communal link permits the pair to assume different potentials which is desirable.

Figure 10:
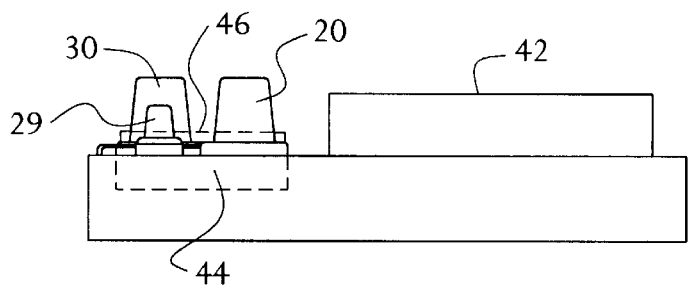
FIG. 10 is a side view of the lid of FIG. 8.
Figure 11:
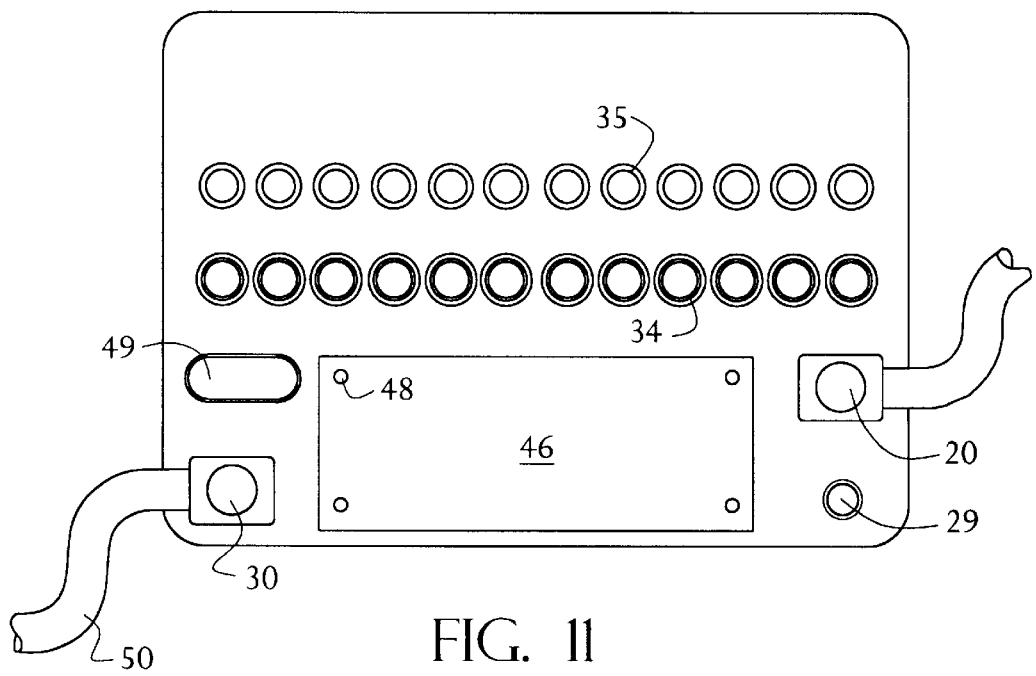
FIG. 11 is a plan of the battery of FIG. 8 showing the connection to the vehicle.
Figure 8:
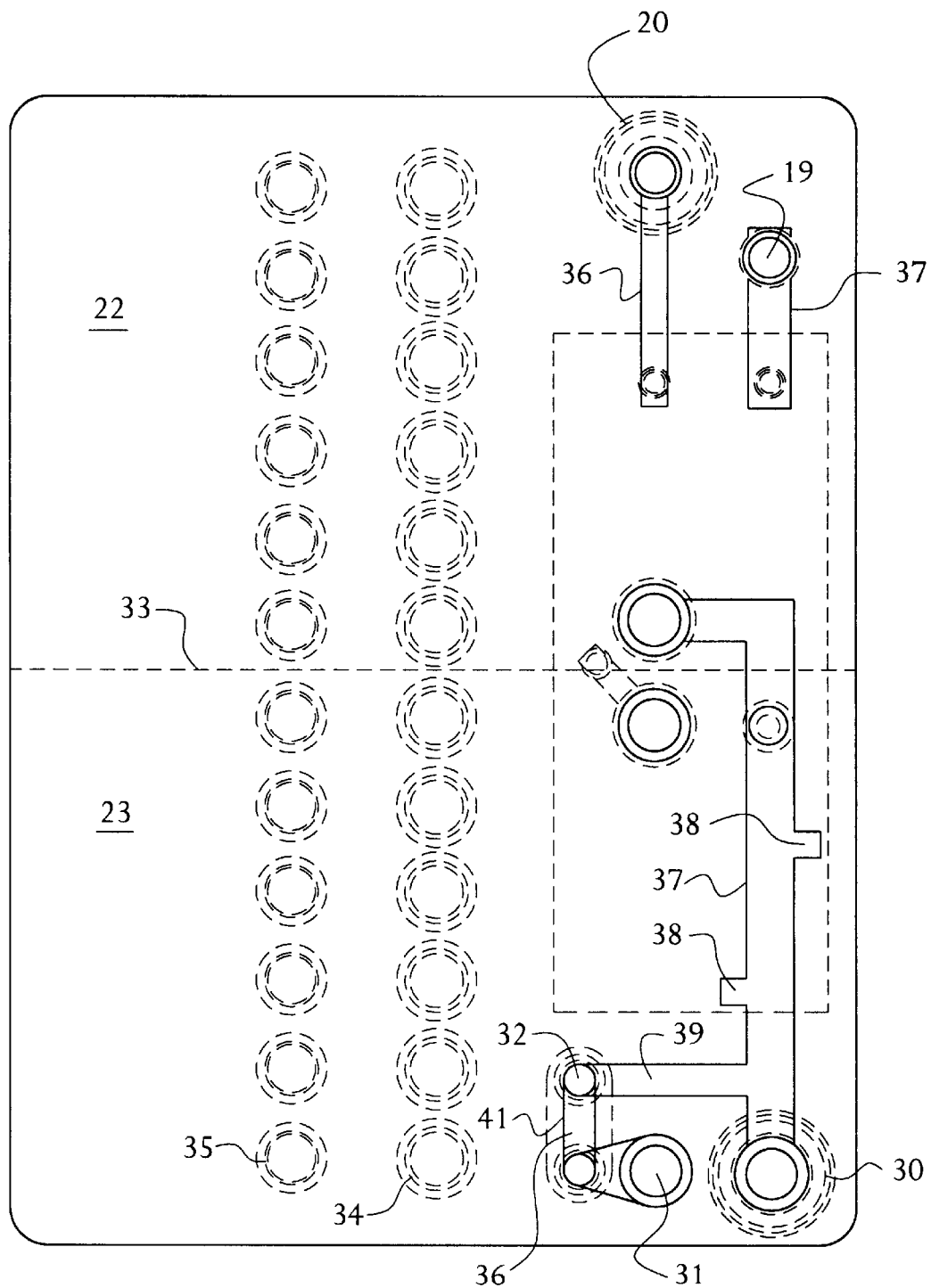
FIG. 8 is a battery lid underplan showing the conductors.

In FIG. 10 and 11 the lid 42 has twin recesses 44 (one shown) which receive the pcb of the electronic switch referred to earlier in this specification. A moulded cover 46 is held by four fasteners 48.

In FIG. 11 the linked AUX negative 31 and the spare terminal 40 are covered by a push-on cover 49 because the AUX and CPA negative poles are communal and earthed by strap 50.

Figure 12:
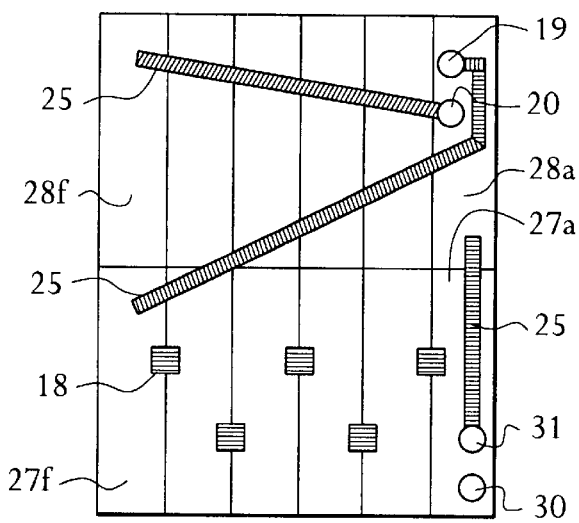
FIG. 12, 13 and 14 are diagrammatic plans of alternative dispositions of cells and the way in which these are connected to the same configuration of terminals.
Figure 13:
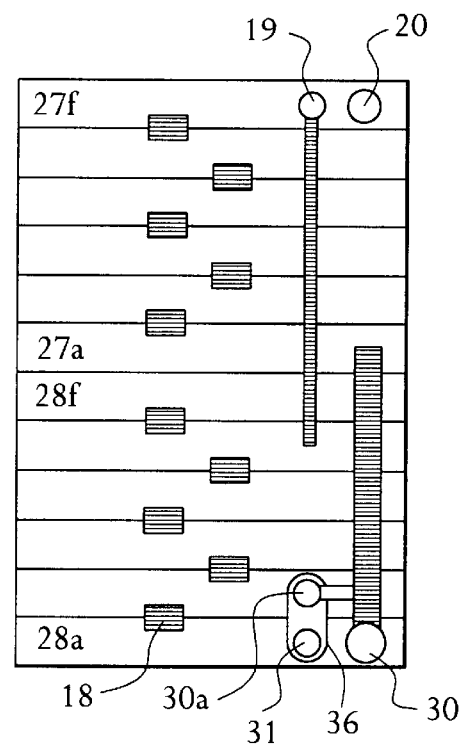
Figure 14:
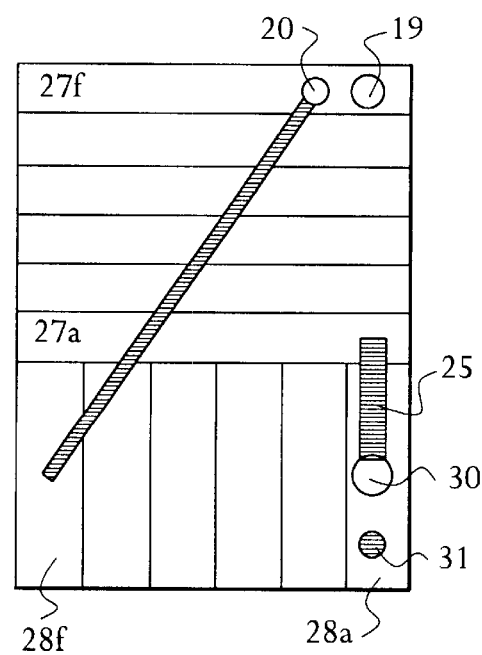
Figure 15:
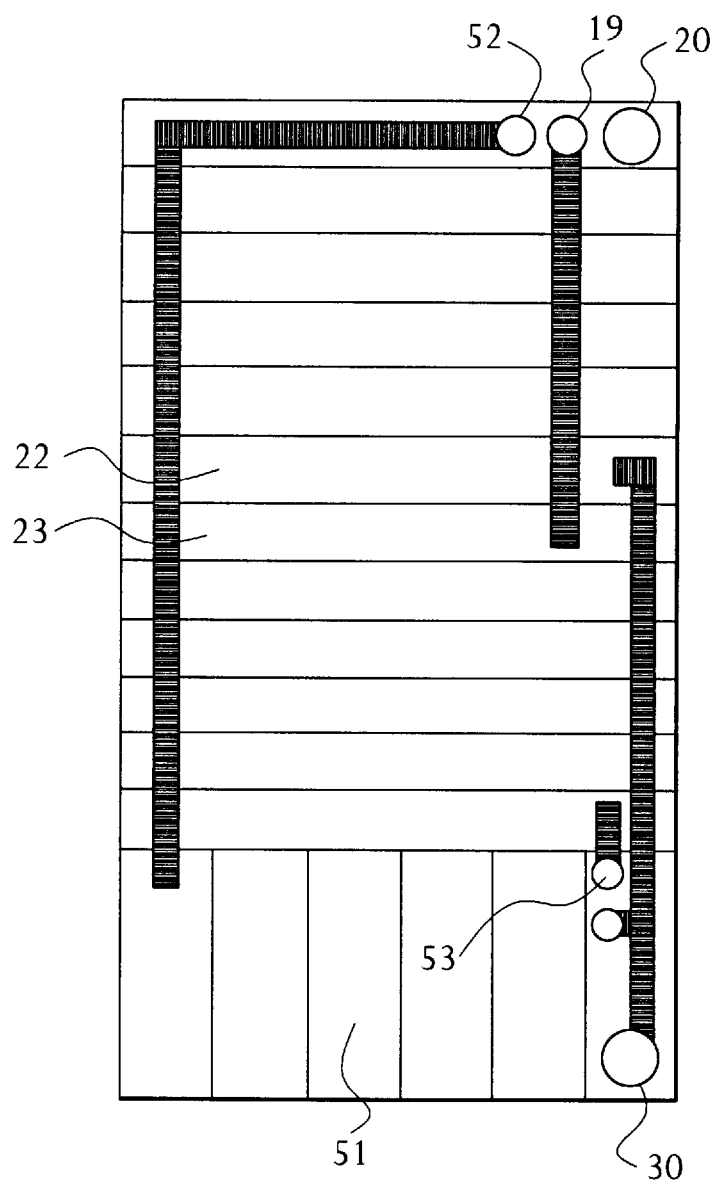
FIG. 15 is a diagrammatic plan view of a battery with CRA battery and two AUX batteries.

In FIGS. 12, 13 and 14 different arrangements of the cells are shown but all have a CRA and AUX battery and four poles.

We have found the advantages of the above embodiments to be:
1. The simplicity of manufacture of a face to face plate array;
2. The polarization and grouping of terminals for operators understanding especially where two batteries must be joined.
3. The provision of a site for the electronic switch that controls battery function.

We claim:
1. A 4-pole battery for vehicle use comprising a CRA battery with a positive pole for connection to a starter motor, an AUX battery with a positive pole for connection to auxiliaries, the CRA battery having plates lying face to face along a horizontal plane of the battery, the AUX battery having deep cycle plates lying face to face along a horizontal plane of the battery, both AUX and CRA batteries being of different construction and accommodated in a case with side by side compartments, the CRA battery having a negative pole and the AUX battery having a negative pole.

2. A 4-pole battery as in claim 1 wherein the volume of the AUX battery is in the range of 35–45% of the volume of the battery.

3. A 4-pole battery as in claim 1 wherein the case is a monobloc moulding.

4. A 4-pole battery as in claim 1 wherein the battery has a set of terminals for the CRA battery and a separate set of terminals for the AUX battery.

5. A 4-pole battery as in claim 1 and a like battery connected thereto in series to give increased voltage.

6. A 4-pole battery as in claim 1 wherein the battery is attached to another battery.

7. A battery as in claim 1 having a monobloc battery case closed by a battery lid housing an AUX battery and a CRA battery yielding 24 v.

8. A battery as in claim 7 wherein the battery has a 12 v tap.

9. A battery as in claim 1 having a monobloc battery case closed by a battery lid housing an AUX battery and a CRA battery yeilding 36 v or more.

10. A multipole battery as in claim 1 wherein the negative poles are linked by a switch.

11. A multipole battery as in claim 1 wherein the negative poles are connected by a conductor link embedded in a lid on the case.

12. A multipole battery comprising a CRA battery intended for connection to a starter motor and an AUX battery intended for connection to auxiliary electrical loads, the CRA battery and the AUX battery being of different construction and each capable of providing a current different from the other, the CRA battery containing parallel plates and the AUX battery containing parallel plates, the AUX and CRA batteries lying face to face along a horizontal plane of the battery in a single battery case, wherein the CRA battery and the AUX battery each have independent positive and negative terminals.

13. A battery as in claim 12 wherein the plates are rectangular in shape.

14. A battery as in claim 12 wherein the battery is a lead acid battery.

15. A battery as in claim 12 wherein the CRA battery and the AUX battery each have a terminal cell and at least one terminal connected to the terminal cell by a conductor.

16. A battery as in claim 15 wherein a provision is provided for linking like terminal together within a battery lid.

17. A battery as in claim 15 wherein at least one terminal is connected to the terminal cell by a conductor.

18. A battery as in claim 12 wherein the battery contains a terminal cell and a battery lid supports both a terminal and an embedded conductor, whereby the terminal is placed remotely from the terminal cell.

19. A battery as in claim 18 wherein the CRA battery and the AUX battery have a communal terminal.

20. A battery as in claim 18 having inter-cell connections wherein all the connections, apart from those used to mutually connect the terminal cells, are on one axis in the CRA battery and one axis in the AUX battery.

21. A battery as in claim 18 wherein the terminal is mounted remotely from the terminal cell.

22. A battery as in claim 18 wherein part of the conductor is moulded into the battery lid.

23. A battery as in claim 18 wherein the lid is a polymeric moulding containing an embedded conductor located in the body of the lid by spacing means incorporated into the polymer of the lid during moulding.

24. A battery as in claim 18 wherein the lid is a polymeric moulding containing an embedded conductor located in the body of the lid by spacing means which are insulative.

25. A battery as in claim 12 having a CRA battery, an AUX battery for electrical auxiliaries and a second AUX battery providing a different current from the first AUX battery.

26. A battery as in claim 25 wherein the second AUX battery provides current for loads requiring constant current.

27. A battery as in claim 18, wherein the embedded conductor is in the form of a link with two holes for bolting onto a supplemental threaded post from the AUX and CRA terminals.

28. A battery as in claim 18, wherein part of the conductor is moulded into the battery lid.

29. A battery as in claim 18, wherein the conductor primarily consists of either soft or hard drawn copper strip.

30. A battery as in claim 29, wherein the copper strip is coated with either tin or a tin based solder.

31. A battery as in claim 18, wherein the conductor is made of or coated with aluminum or silver.

32. A battery as in claim 18, wherein the conductor is provided with means for mechanical stabilization thereof in the lid of the battery.

33. A battery as in claim 12, wherein the CRA battery is larger than the AUX battery.

* * * * *